July 10, 1956     J. B. STEVENS     Re. 24,551
                                                                                2,754,140
SEALING MEANS FOR TWO RELATIVELY ROTATABLE PARTS
Filed Dec. 6, 1952
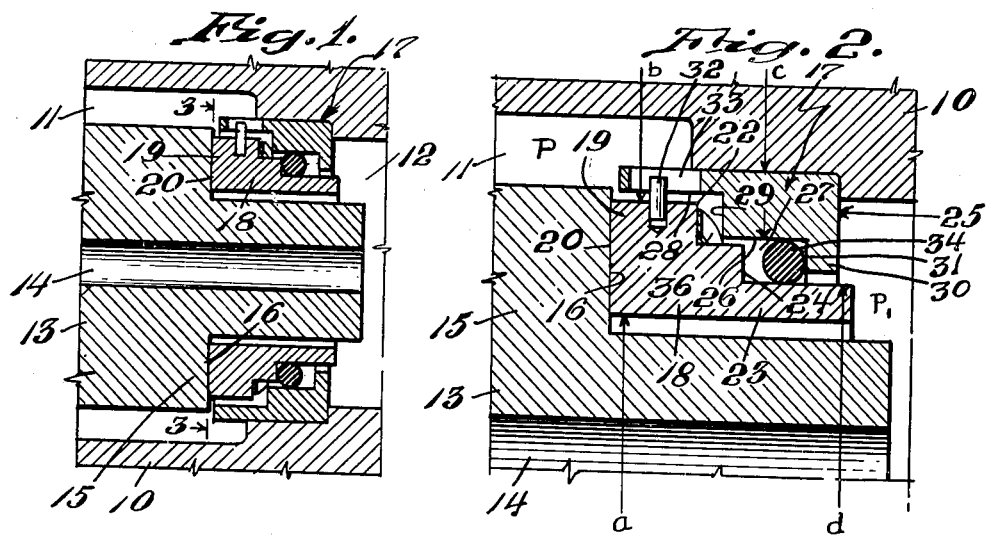
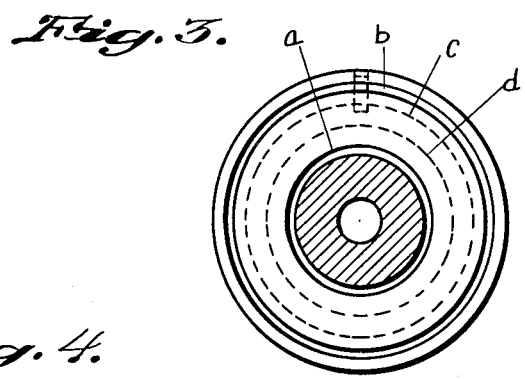
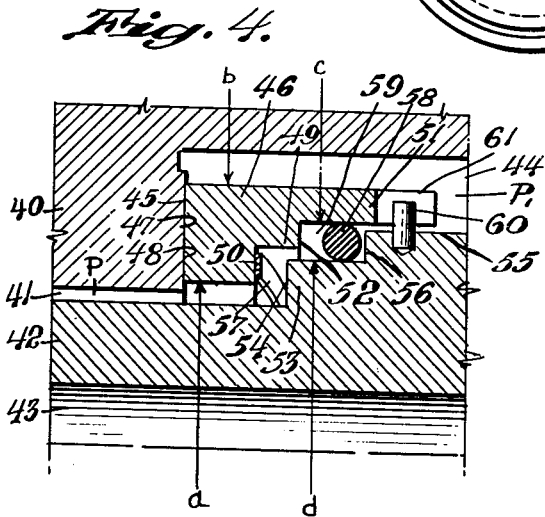
INVENTOR.
Justus B. Stevens
BY
Barlow & Barlow
ATTORNEYS.

United States Patent Office 2,754,140
Patented July 10, 1956

2,754,140

SEALING MEANS FOR TWO RELATIVELY ROTATABLE PARTS

Justus B. Stevens, East Providence, R. I., assignor to Sealol Corporation, a corporation of Rhode Island Application December 6, 1952, Serial No. 324,498

3 Claims. (Cl. 286—11.14)

This invention relates to a fluid pressure sealing means for two relatively rotating members such as a shaft and a casing.

An object of the invention is to provide a fluid pressure sealing means which is adapted for sealing two relatively rotating members in which there is a pressure differential between opposite sides of the seal between said members and which differential may be reversible.

A more specific object of this invention is to provide a fluid seal under a pressure acting thereon which may be varied and yet the pressures on opposite sides may be reversed as to differential and the seal will still operate.

A still further object of the invention is to provide a reversible seal in which the pressure to cause the seal to be affected will bear substantially the same proportion to the sealing face irrespective of which side of the seal is under greater pressure.

With these and other objects in view, the invention consists of certain novel features of construction as will be more fully described and particularly pointed out in the appended claims.

In the accompanying drawings:

Figure 1 is a central sectional view of a shaft and casing embodying my invention;

Figure 2 is a similar view of a portion of the apparatus shown in Figure 1 but with the relative pressures on opposite sides changed;

Figure 3 is a sectional view on line 3—3 of Figure 1;

Figure 4 is a sectional view similar to Figure 2 of a modified construction.

With reference to the drawings, 10 designates generally a casing which by way of example may be the housing of a power transmitting unit having a chamber or region 11 containing a fluid under pressure which will be hereinafter referred to as a working fluid. The casing 10 has a second chamber or region 12 adjoining the chamber 11 and also containing a fluid which may be a different fluid from that contained in chamber 11 or may be the same working fluid but under conditions such that a pressure differential may exist between the fluids of the two chambers. A rotatably mounted shaft 13 having a central bore 14 therethrough and an annular abutment 15 extends through the chamber 11 and projects into chamber 12. Fluid may be introduced into chamber 12 through the bore 14, or fluid from the chamber 12 may pass outwardly through the said bore 14 as conditions may require. The abutment 15 provides an annular radial sealing surface 16 which is adapted to be engaged by a sealing means designated generally 17.

The sealing means 17 comprises a sleeve 18 which may move toward the sealing surface 16 relative to the inner end portion of the shaft 13 which projects into the chamber 12. This sleeve 18 has formed at one end thereof an annulus or ring 19, the outer end of which provides a sealing surface 20 adapted to be moved into engagement with the surface 16 to provide a seal against the passage of fluid from chamber 11 between these engaging surfaces 16, 20. The sleeve provides a shoulder 22 and has a reduced skirt portion 23 providing a shoulder 24. A sleeve retainer 25 (Figure 2) is frictionally received in the walls of the chamber 12 and is held fixed thereto so as to be stationary with and sealed to the casing 10.

The retainer 25 is shown to be of a length less than that of the sleeve 18 and surrounds the same and has a central bore 26 (Figure 2) which is of a diameter to provide a space 27 between the said sleeve and wall of the bore 26. The bore 26 is enlarged at the forward end as at 28 forming a shoulder 29 to be opposite or spaced from the shoulder 22. The bore 26 is reduced at the other end as at 30 (Figure 2) to form a shoulder 31, the skirt portion 23 extending through and outwardly of the said bore 26. The sleeve 18 is held against rotation relative to the shaft 13 such as by means of a radial pin 32 which extends from sleeve 18 into slot 33 provided at the end portion of the retainer 25, thus permitting sliding movement of the said sleeve relative to the shaft 13 and within the retainer 25.

A soft resilient O-ring packing 34 is positioned between the skirt 23 and the wall of the bore 26 to seal and block the passage of fluid from one chamber to another between the sleeve 18 and retainer 25. While the O-ring alone may suffice, ring packings may be positioned on either side of the O-ring if desired to provide thrust transmitting means between the retainer and sleeve. The packing may lodge against either shoulder 31 of the retainer as in Figure 2 or shoulder 24 of the sleeve as in Figure 1 depending on which chamber is under higher pressure. A flat spring 36 is positioned between the shoulder 22 and the shoulder 29 to resiliently bias the sleeve into engagement with the surface 16.

In Figure 4 the operation of the seal is the same as above described, but the structure is shown as reversed in that the member which is comparable to the sleeve 18 above described in this case rotates with the shaft, while the sealing face with which the sleeve engages instead of being on the shaft is stationary or fixed to the casing.

In Figure 4 the casing is designated 40, having a chamber at 41 through which the shaft 42 extends. A bore 43 extends through this shaft to a chamber 44, while a seal is maintained between these two chambers. The casing 40 is provided with a sealing face 45 which extends radially with reference to the axis of the shaft, and a sleeve 46 having a sealing face 47 engages the face 45. This sealing face 47 is on the annular end portion 48 of the sleeve, the sleeve being reduced as at 49 to provide an abutment 50, and is further reduced as at 51 to provide an abutment 52. The shaft 42 is of a larger diameter as at 53 to provide a shoulder 54 and is further enlarged as at 55 to provide a shoulder 56. A spring 57 acts between the shoulders 50 and 54 to urge the sleeve, causing the sealing faces 45 and 47 to contact. An O-ring 58 is located in the space 59 between the portion 51 of the sleeve and the portion 53 of the shaft and between the abutment 52 of the sleeve and 56 of the shaft so as to prevent the passage of fluid from chamber 41 to chamber 44 or vice versa. A pin 60 extends from the shaft into a slot 61 in the sleeve so as to cause the sleeve to rotate with the shaft and yet permit relative movement of the sleeve with reference to the shaft toward the sealing face.

Letters a, b, c, and d designate the diameters of the parts designated by the arrows leading from these letters, and the relationship is such that when the pressure in the chamber 11, which is designated P is greater than the pressure in the chamber 12 designated P′, as in Figure 2, or similarly the chamber 41 designated P and chamber 44 designated P′, as in Figure 4, the thrust of the sleeve 18 or 46 on the sealing surface will equal P multiplied by the area represented by b minus d plus the pressure P′ multiplied by the area represented by $d$ minus $a$; that is, $$T(=\text{resultant thrust})=\frac{\pi}{4}[P(b^2-d^2)+P'(d^2-a^2)]$$

and in the case when pressure P is less than P', as in Figure 1, then the thrust on the sealing face will equal P multiplied by the area represented by $b$ minus $c$ plus P' multiplied by the area represented by $c$ minus $a$.

$$T(=\text{resultant thrust})=\frac{\pi}{4}[P(b^2-c^2)+P'(c^2-a^2)]$$

Thus, the values are so chosen that in all cases the resultant thrust will be toward the sealing face regardless of whether the pressure in one chamber or the other chamber is greater.

It will also be apparent that the pressure on the sealing face may be adjusted by varying the diameters designated $a$, $b$, $c$, and $d$ so that the desired unit pressure may be had. For example, in practice the area represented by $b-d$ will equal 85% of the area of the sealing contact, and the area represented by $c-d$ will also equal 85% of the sealing contact, or the latter area may equal 65% of the sealing contact.

I claim:

1. A sealing means for two relatively rotatable members comprising a casing member having adjoining regions opening one into the other and each adapted to contain a fluid under pressure which may alternately be one greater than the other, a rotatable shaft member extending within said regions and having an annular radial surface at a position thereon to be within one of said regions, a slidable sleeve surrounding said shaft on the portion thereof within the other region and having a face in sealing engagement with said radial surface to block the passage of fluid past said sleeve at said radial surface, means for holding said sleeve against rotation relative to the casing member, a radial shoulder on said sleeve and a radial shoulder on said casing member, an annular cylindrical surface on said sleeve and an opposed annular cylindrical surface on the casing member, a packing located between said shoulders and said annular cylindrical surfaces, said annular cylindrical surfaces both being of radii greater than the smaller radius of the sealing face of the slidable sleeve and the smaller than the largest radius of the sealing face of the slidable sleeve and the annular cylindrical surface of said casing member overlapping the radial shoulder of said sleeve and the annular cylindrical surface of said sleeve overlapping the said radial shoulder of said casing member, said overlap being sufficient to confine the packing whereby the packing may shift from one shoulder to the other depending on the region having greatest pressure and the major portion of the area between said annular cylindrical surfaces is utilized to urge the sleeve toward the radial surface of said shaft regardless of which region is under greatest pressure.

2. A sealing means as set forth in claim 1 wherein resilient means also urges said sleeve toward the radial surface of said shaft.

3. A sealing means as set forth in claim 1 wherein there is a second pair of opposed radial shoulders on said sleeve and casing member and a spring acts between said second pair of shoulders to also urge said sleeve toward the radial surface of said shaft.

References Cited in the file of this patent

UNITED STATES PATENTS

| | | |
|---|---|---|
| 2,297,302 | Hornschuch | Sept. 29, 1942 |
| 2,365,046 | Bottomley | Dec. 12, 1944 |
| 2,393,944 | Walley | Jan. 29, 1946 |
| 2,429,953 | Bottomley | Oct. 28, 1947 |
| 2,639,204 | Terry | May 19, 1953 |
| 2,653,837 | Voytch | Sept. 29, 1953 |

FOREIGN PATENTS

| | | |
|---|---|---|
| 506,524 | Great Britain | May 30, 1939 |

OTHER REFERENCES

"Liquid Seal," Product Engineering, March 1950, page 178 relied upon. (Copy Scientific Library and Div. 52.)